US011990699B2

(12) United States Patent
Maeda et al.

(10) Patent No.: US 11,990,699 B2
(45) Date of Patent: May 21, 2024

(54) CONNECTOR AND CONNECTOR SET INCLUDING A TERMINAL ABUTTING A SIDE WALL MEMBER

(71) Applicant: Murata Manufacturing Co., Ltd., Kyoto-fu (JP)

(72) Inventors: Yoshiro Maeda, Nagaokakyo (JP); Daisuke Okubo, Nagaokakyo (JP); Minoru Mamuro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 355 days.

(21) Appl. No.: 17/459,750

(22) Filed: Aug. 27, 2021

(65) Prior Publication Data

US 2021/0391661 A1 Dec. 16, 2021

Related U.S. Application Data

(63) Continuation of application No. PCT/JP2020/006963, filed on Feb. 21, 2020.

(30) Foreign Application Priority Data

Feb. 27, 2019 (JP) ................................ 2019-034040
May 17, 2019 (JP) ................................ 2019-093312

(51) Int. Cl.
*H01R 12/71* (2011.01)
*H01R 12/73* (2011.01)
(Continued)

(52) U.S. Cl.
CPC ........... *H01R 12/716* (2013.01); *H01R 12/73* (2013.01); *H01R 13/6471* (2013.01); *H01R 13/6473* (2013.01)

(58) Field of Classification Search
None
See application file for complete search history.

(56) References Cited

U.S. PATENT DOCUMENTS 5,915,976 A * 6/1999 McHugh ........... H01R 13/6582 439/74
6,910,900 B2 * 6/2005 Pan ....................... H01R 12/00 439/74
(Continued)

FOREIGN PATENT DOCUMENTS

JP 2008-218095 A 9/2008
JP 2013-089342 A 5/2013
(Continued)

OTHER PUBLICATIONS

International Search Report issued in PCT/JP2020/006963; dated Apr. 14, 2020.
(Continued)

*Primary Examiner* — Oscar C Jimenez
(74) *Attorney, Agent, or Firm* — Studebaker & Brackett PC

(57) ABSTRACT

A connector includes a plurality of inner terminals and an outer terminal. The plurality of inner terminals are arrayed with intervals therebetween in a direction. The plurality of inner terminals are terminals that are connected to a ground potential. The outer terminal is disposed around the group of the plurality of arrayed inner terminals and are connected to a ground potential. The outer terminal includes side wall members that are shaped so as to extend in the direction and be parallel to the plurality of inner terminals. The inner terminals include connection parts that are connected to the side wall members.

20 Claims, 11 Drawing Sheets

(51) Int. Cl.
*H01R 13/6471* (2011.01)
*H01R 13/6473* (2011.01)

(56) References Cited

U.S. PATENT DOCUMENTS

| | | | | |
|---|---|---|---|---|
| 9,048,554 | B2 * | 6/2015 | Tagawa | H01R 12/707 |
| 2012/0184145 | A1 * | 7/2012 | Zeng | H01R 13/6585 439/626 |
| 2015/0207248 | A1 * | 7/2015 | Takenaga | H01R 12/716 439/74 |

FOREIGN PATENT DOCUMENTS

| | | | |
|---|---|---|---|
| JP | 2013-242971 | A | 12/2013 |
| JP | 2015-130238 | A | 7/2015 |
| JP | 2015-135806 | A | 7/2015 |
| JP | 2016-066477 | A | 4/2016 |
| JP | 6399342 | B2 | 10/2018 |

OTHER PUBLICATIONS

International Preliminary Report on Patentability and Written Opinion issued in PCT/JP2020/006963; dated Aug. 25, 2021.

* cited by examiner

CONNECTOR AND CONNECTOR SET INCLUDING A TERMINAL ABUTTING A SIDE WALL MEMBER

CROSS-REFERENCE TO RELATED APPLICATIONS

This application claims benefit of priority to International Patent Application No. PCT/JP2020/006963, filed Feb. 21, 2020, to Japanese Patent Application No. 2019-034040, filed Feb. 27, 2019, and to Japanese Patent Application No. 2019-093312, filed May 17, 2019, the entire contents of each are incorporated herein by reference.

BACKGROUND

Technical Field

The present disclosure relates to a connector that includes a plurality of arrayed inner terminals and an outer terminal shaped so as to surround the plurality of inner terminals.

Background Art

Japanese Unexamined Patent Application Publication No. 2016-66477 discloses a connector device that includes ground contact terminals and signal contact terminals. A prescribed number of ground contact terminals and a prescribed number of signal contact terminals are provided. The ground contact terminals and the signal contact terminals are arrayed along a specific direction in the connector device.

The connector device includes a casing. The casing includes a part (side member) that is parallel to the direction in which the ground contact terminals and the signal contact terminals are arrayed.

The side member includes a contact engagement part. The contact engagement part is shaped so as to hold the ground contact terminals. The side member is connected to the ground potential of a wiring board, to which the ground contact terminals are connected, by the contact engagement part.

SUMMARY

However, since the contact engagement part is structured so as to hold the ground contact terminals, the contact engagement part is in close proximity to other terminals adjacent to the ground contact terminals.

Therefore, the other terminals and the contact engagement part couple with each other, impedance matching is not realized, and the transmission characteristics of the connector are degraded.

On the other hand, if a contact coupling part is not used, the transmission characteristics will be degraded due to the grounding state of the side member.

Therefore, the present disclosure provides a connector having excellent transmission characteristics while using an outer terminal side wall member (side member).

A connector according to an aspect of the present disclosure includes a plurality of inner terminals, an insulating member, and an outer terminal. The plurality of inner terminals are arrayed with intervals therebetween in a first direction. The plurality inner terminals includes a first inner terminal that is connected to a signal line and a second inner terminal that is connected to a ground potential. The insulating member supports the plurality of inner terminals. The outer terminal is disposed around the plurality of inner terminals with the insulating member interposed therebetween and is connected to the ground potential. The outer terminal includes a side wall member that is shaped so as to extend in the first direction and is parallel to the plurality of arrayed inner terminals. The second inner terminal has a connection part that is connected to the side wall member.

With this configuration, a position midway along the side wall member in the extension direction of the side wall member is connected to the ground potential via the second inner terminal. As a result, the interval at which the side wall member is connected to the ground potential in the extension direction of the side wall member is reduced, and even if unwanted resonance is generated, the frequency of that resonance is increased.

According to the present disclosure, excellent transmission characteristics can be obtained while using a side wall member of an outer terminal.

DETAILED DESCRIPTION

First Embodiment

Figure 1A:
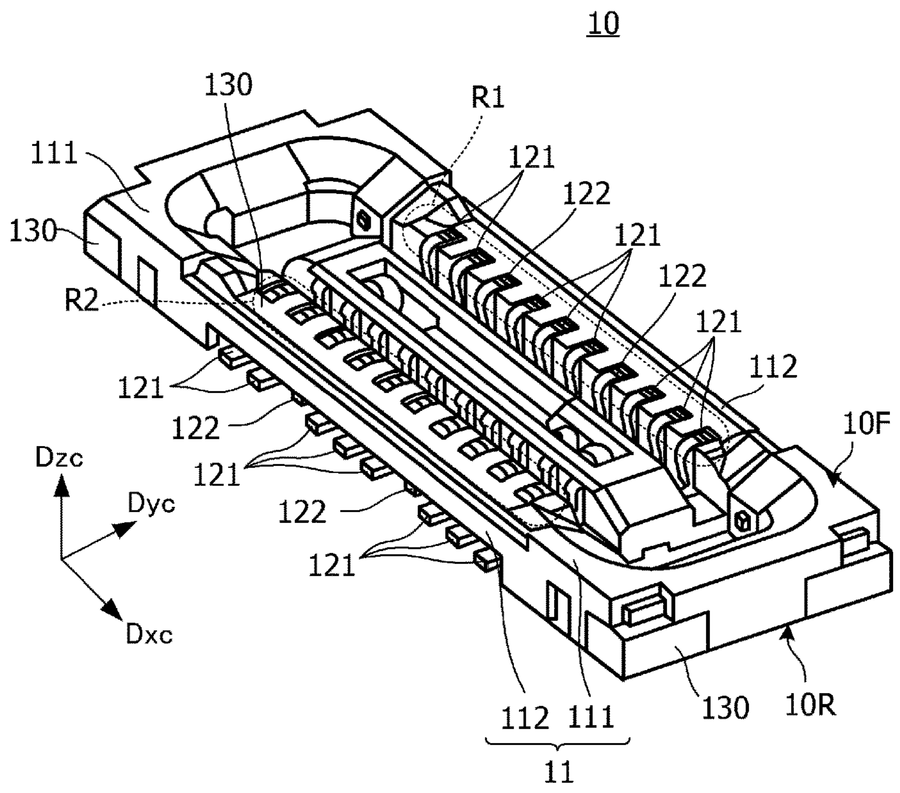
FIG. 1A is an external perspective view of a connector according to a First Embodiment.
Figure 1B:
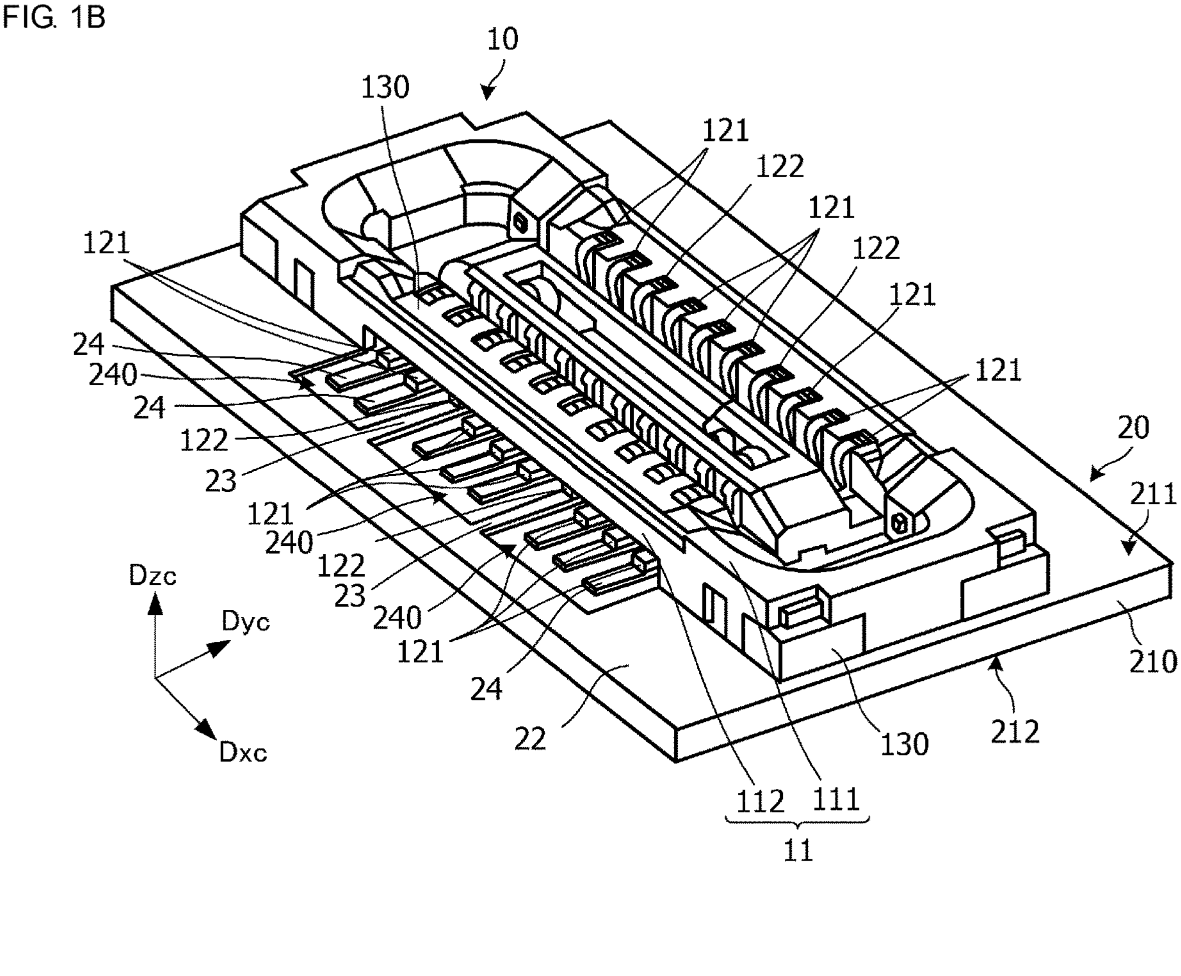
FIG. 1B is an external perspective view of a connector member according to the First Embodiment.
Figure 2:
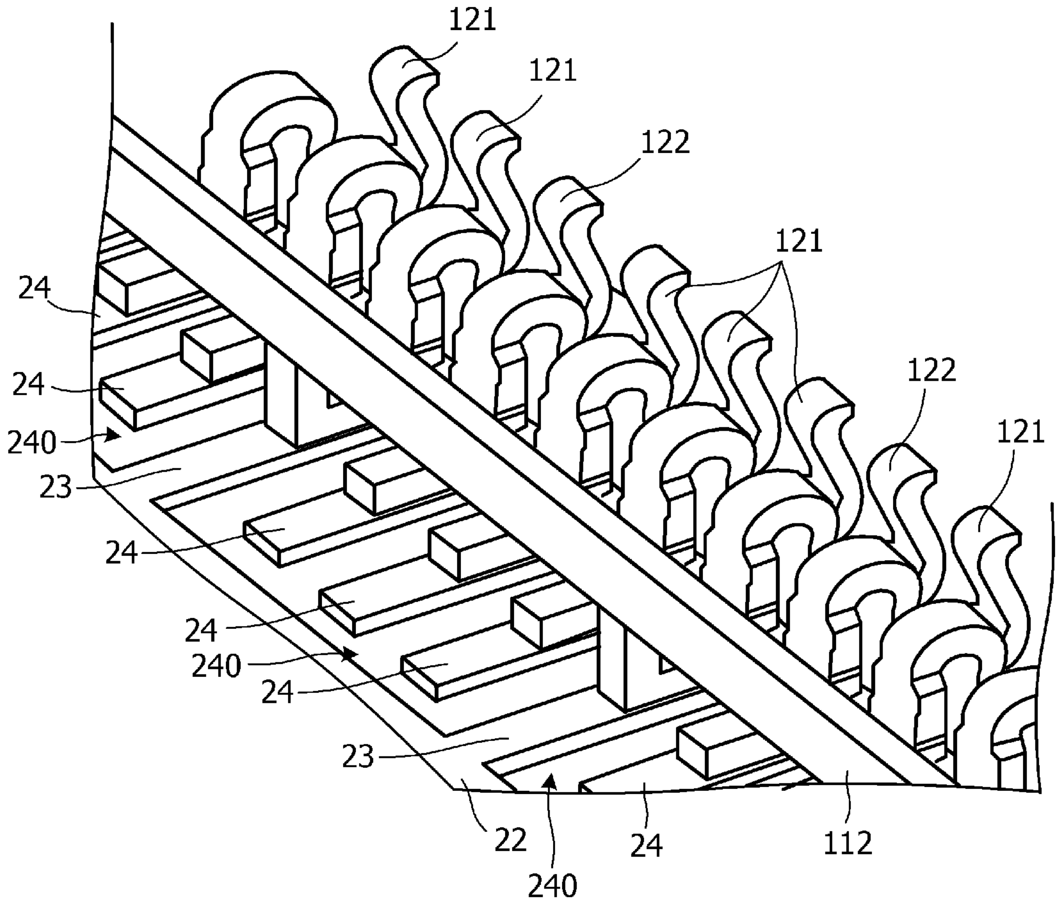
FIG. 2 is an enlarged perspective view of a part in which a side wall member and a plurality of inner terminals are disposed.

A connector according to a First Embodiment will be described while referring to the drawings. FIG. 1A is an external perspective view of a connector according to the First Embodiment, and FIG. 1B is an external perspective view of a connector member according to the First Embodiment. FIG. 2 is an enlarged perspective view of a part in which a side wall member and a plurality of inner terminals are disposed. In the drawings referred to in the following embodiment, the vertical-horizontal dimensional relationships are illustrated in an exaggerated manner where appropriate and may not necessarily correspond to the actual vertical-horizontal dimensional relationships. In addition, some symbols are omitted as necessary in order to make the figures easier to view.

(Structure of Connector 10)

As illustrated in FIGS. 1A and 1B, a connector 10 includes an outer terminal 11, inner terminals 121, inner terminals 122, and an insulating member 130. The number of inner terminals 121 is determined by the number of signals to be transmitted. In addition, the number of inner terminals 122 is also determined as appropriate within a scope where the concept of the present disclosure is to be applied.

The connector 10 has a substantially rectangular parallelepiped shape and is shaped so as to be long in a direction Dxc and short in a direction Dyc. The connector 10 has a mounting surface 10R and a mating surface 10F. The connector 10 is mounted on a substrate 20 with the mounting surface 10R facing the substrate 20.

The inner terminals 121 and the inner terminals 122 are composed of a metal that is electrically conductive and easily deformable.

The inner terminals 121 and the inner terminals 122 are disposed in two rows with intervals therebetween along the direction Dxc. In addition, the two rows are disposed with an interval therebetween in the direction Dyc. For example, in the case in FIGS. 1A and 1B, in a first row R1, two inner terminals 121, an inner terminal 122, three inner terminals 121, an inner terminal 122, and three inner terminals 121 are arrayed in this order from one end to the other end in the direction Dxc. In addition, in a second row R2, two inner terminals 121, an inner terminal 122, three inner terminals 121, an inner terminal 122, and three inner terminals 121 are arrayed in this order from one end to the other end in the direction Dxc. The number of rows consisting of a plurality of inner terminals is not limited to two, and may be one, three, or more to the extent that the number of rows is consistent with the spirit of the present disclosure.

The arrayed states of the inner terminals 121 and the inner terminals 122 are maintained by the insulating member 130. The insulating member 130 is composed of a resin, for example.

The outer terminal 11 is disposed on a surface of the insulating member 130. The outer terminal 11 includes two end members 111 and two side wall members 112. The outer terminal 11 is, for example, composed of a metal that is electrically conductive and is easy to process.

The two end members 111 are disposed with a prescribed interval therebetween in the direction Dxc. More specifically, one end member 111 is disposed at one end of the group of arrayed inner terminals 121 and inner terminals 122 in the direction Dxc (hereafter, referred to as a group of arrayed inner terminals). The other end member 111 is disposed at the other end of the group of arrayed inner terminals in the direction Dxc.

The two side wall members 112 are disposed with a prescribed interval therebetween in the direction Dyc. More specifically, one side wall member 112 is disposed on the opposite side of the group of arrayed inner terminals of the first row R1 from the group of arrayed inner terminals of the second row R2 in the direction Dyc. The other side wall member 112 is disposed on the opposite side of the group of arrayed inner terminals of the second row R2 from the group of arrayed inner terminals of the first row R1 in the direction Dyc.

The two side wall members 112 are shaped so as to extend in the direction Dxc. In other words, the two side wall members 112 are shaped so as to extend in the direction in which the inner terminals of each row are arrayed. One end of each of the two side wall members 112 is connected to one end member 111. The other end of each of the two side wall members 112 is connected to the other end member 111.

With this configuration, the outer terminal 11 is disposed so as to surround the group of arrayed inner terminals when looking in direction Dzc. In addition, the two side wall members 112 are disposed so as to be at a prescribed interval from the mounting surface 10R of the connector 10 in the direction Dzc. The direction Dzc is the thickness direction of the connector 10 and is a direction perpendicular to the direction Dxc and the direction Dyc. In other words, the thickness direction of the connector 10 is the direction in which the connector 10 mates with another connector.

The connector 10 having this shape is mounted on the substrate 20, which will be described next.

The substrate 20 includes a base member 210 and has a top surface 211 and a bottom surface 212. The substrate 20 may be formed of a ceramic multilayer body, for example. A ground conductor 22, a plurality of ground connection electrodes 23, and a plurality of signal electrodes 24 are formed on the top surface 211. The ground connection electrodes 23 and the ground conductor 22 are connected to each other. The signal electrodes 24 are isolated from the ground conductor 22 and the ground connection electrodes 23 by conductor not-formed parts 240. The signal electrodes 24 are connected to conductor patterns (not illustrated) formed in or on inner layer parts of the substrate 20 by via conductors (not illustrated).

The inner terminals 121 of the connector 10 are mounted on the signal electrodes 24. The signal electrodes 24 are isolated from the ground conductor 22 and the ground connection electrodes 23 and are used for signal transmission, and therefore, the inner terminals 121 function as inner terminals for signal transmission. In other words, the inner terminals 121 correspond to "first inner terminals" of the present disclosure. The inner terminals 121 may include a terminal used for supplying power.

The inner terminals 122 of the connector 10 are mounted on the ground connection electrodes 23, which are respectively provided therefor. The ground connection electrodes 23 are connected to the ground conductor 22, and therefore the inner terminals 122 function as ground connection inner terminals that are connected to a ground potential. In other words, the inner terminals 122 correspond to "second inner terminals" of the present disclosure.

The end members 111 of the outer terminal 11 of the connector 10 are mounted on the ground conductor 22.

(Specific Shapes of Inner Terminals)

Figure 3A:
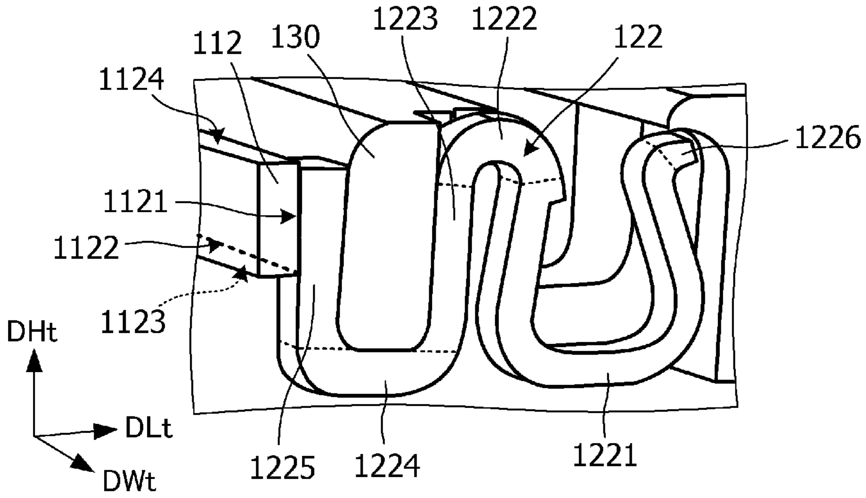
FIG. 3A is an enlarged perspective view illustrating the positional relationship between a grounding-use second inner terminal and a side wall member of the connector according to the First Embodiment.
Figure 3B:
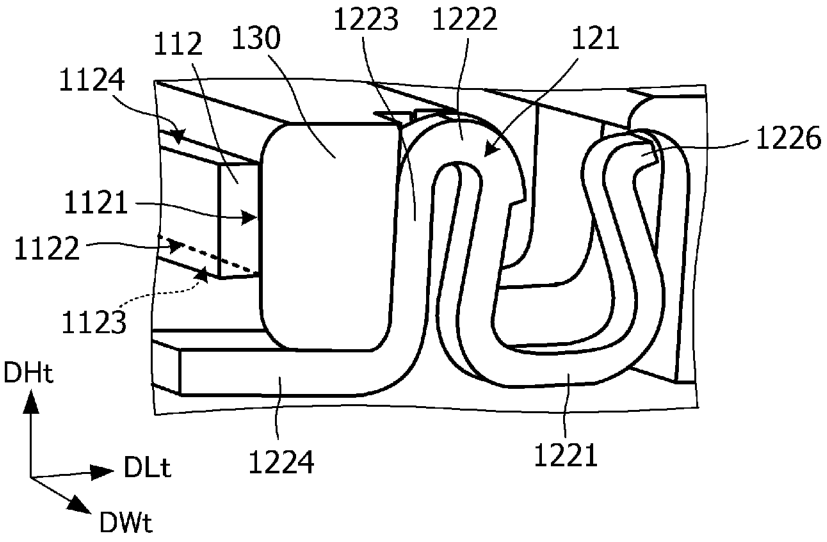
FIG. 3B is an enlarged perspective view illustrating the positional relationship between a grounding-use second inner terminal, a signal-use inner terminal, and a side wall member of the connector according to the First Embodiment.

FIG. 3A is an enlarged perspective view illustrating the positional relationship between a grounding-use second inner terminal and a side wall member of the connector according to the First Embodiment, and FIG. 3B is an enlarged perspective view illustrating the positional relationship between a grounding-use second inner terminal, a signal-use inner terminal, and a side wall member of the connector according to the First Embodiment.

The inner terminal 121 and the inner terminal 122 are each formed, for example, by bending a rod-shaped conductor having a prescribed cross-sectional area. The cross sections of the inner terminal 121 and the inner terminal 122 are substantially rectangular. The cross-sectional areas of the inner terminal 121 and the inner terminal 122 are basically identical. The inner terminals may be formed by die-cutting an elastic metal member.

(Shape of Inner Terminal 122)

As illustrated in FIG. 3A, each inner terminal 122 includes a mating part 1221, a routing part 1222, a routing part 1223, a mounting terminal part 1224, a connection part 1225, and an inner end portion 1226.

One end of the mating part 1221 is connected to the inner end portion 1226. The other end of the mating part 1221 is connected to one end of the routing part 1222. The other end of the routing part 1222 is connected to one end of the routing part 1223. The other end of the routing part 1223 is connected to the mounting terminal part 1224. The connection part 1225 is connected to the mounting terminal part 1224. These parts are disposed along a length direction DLt of the inner terminal. The inner terminal is held by the insulating member 130 so that the length direction DLt is parallel to the above-mentioned direction Dyc.

The mating part 1221 is U shaped when looking in a width direction DWt that is perpendicular to the length direction DLt. "U shaped" is not limited to meaning a U shape and may be any shape that protrudes when looking from the routing part 1222 or the inner end portion 1226 may be adopted. Here, "U shaped" includes shapes having a curvature and an n shape. The mating part 1221 is disposed so as to open toward the mating surface 10F of the connector 10. In other words, the part of the mating part 1221 that is parallel to the length direction DLt is disposed on the side near the mounting surface 10R of the connector 10. An electrical connection between the connector 10 and another connector is realized by the inner terminal of the other connector (not illustrated) mating with the mating part 1221.

The routing part 1222 is shaped so as to mainly extend in the length direction DLt and is bent in the opposite direction from the mating part 1221. The routing part 1223 is shaped so as to extend in a height direction DHt.

The mounting terminal part 1224 is shaped so as to extend in a straight line shape along the length direction DLt. The mounting terminal part 1224 of the inner terminal 122 abuts against and is bonded to the ground connection electrode 23. Here, "abuts against and is bonded to" may indicate a configuration in which the ground connection electrode 23 is connected to the mounting terminal part 1224 of the inner terminal 122 via an electrically conductive adhesive such as solder.

The connection part 1225 is shaped so as to extend in a straight line shape along the height direction. An end portion of the connection part 1225 that is on the opposite side from the part that is connected to the mounting terminal part 1224 abuts against the side wall member 112 along a prescribed length.

More specifically, the side wall member 112 has a rectangular parallelepiped shape with a rectangular cross section that is perpendicular to the extension direction thereof and has an inner wall 1121, an outer wall 1122, a bottom wall 1123, and a top wall 1124. The connection part 1225 abuts against the inner wall 1121. As a result of the connection part 1225 abutting against the inner wall 1121, the connection part 1225 and the side wall member 112 can be connected to each other without increasing the width of the connector.

With this configuration, the side wall member 112 is connected to the ground potential via the inner terminal 122.

(Shape of Inner Terminal 121)

As illustrated in FIG. 3B, the inner terminal 121 differs from the inner terminal 122 in that there is no connection part 1225 and the mounting terminal part 1224 extends without entering the space between the top wall 1124 and the insulating member 130. The rest of the configuration is the same as that of the inner terminal 122 and detailed description thereof will be omitted. The mounting terminal part 1224 of the inner terminal 121 abuts against and is bonded to the signal electrode 24.

With this configuration, the inner terminal 121 abuts against and is bonded to the signal electrode 24. Furthermore, the inner terminal 122 abuts against and is bonded to the ground connection electrode 23.

(Description of Operational Effects Realized by Configuration of Present Application)

With the above configuration, each side wall member 112 of the outer terminal 11 is connected to the ground potential at a plurality of places midway along the length direction (two places in this embodiment) via the inner terminals 122. As a result, the distance between the positions where the side wall members 112 are connected to the ground potential is reduced compared with a configuration of the related art in which there are no connection parts 1225. In other words, parts where the side wall members 112 are connected to the ground potential may be provided at a plurality of points between one end and the other end of each side wall member 112 rather than just at the two ends (one end and other end) of each side wall member 112.

For example, in the configuration of the related art, the side wall members 112 are connected to the ground potential via the end members 111. Therefore, the distance between the positions where the side wall members 112 are connected to the ground potential is equivalent to the length of the side wall members 112. On the other hand, in the configuration of this embodiment, the distance between the positions where the side wall members 112 are connected to the ground potential is equal to the interval at which the inner terminals 122 are disposed (in this embodiment, the interval within which three inner terminals 121 are disposed), which is shorter than in the related art.

This shortens the frequency of unwanted resonance generated by coupling with the side wall members 112. Therefore, an increase in transmission loss in the connector 10 due to this resonance is suppressed as a result of the frequency of the resonance being higher than the frequency band of a radio-frequency signal transmitted using the connector 10.

In other words, the interval at which the inner terminals 122 are disposed can be determined on the basis of the highest frequency of radio-frequency signals transmitted using the connector 10. More specifically, for example, the interval at which the inner terminals 122 are disposed is smaller than ½ the wavelength of the highest frequency. More specifically, the longest interval among intervals at which adjacent inner terminals 122 are disposed is smaller than ½ the wavelength of the highest frequency. As a result, an increase in transmission loss in the connector 10 is suppressed even in a structure including the side wall members 112.

Figure 4A:
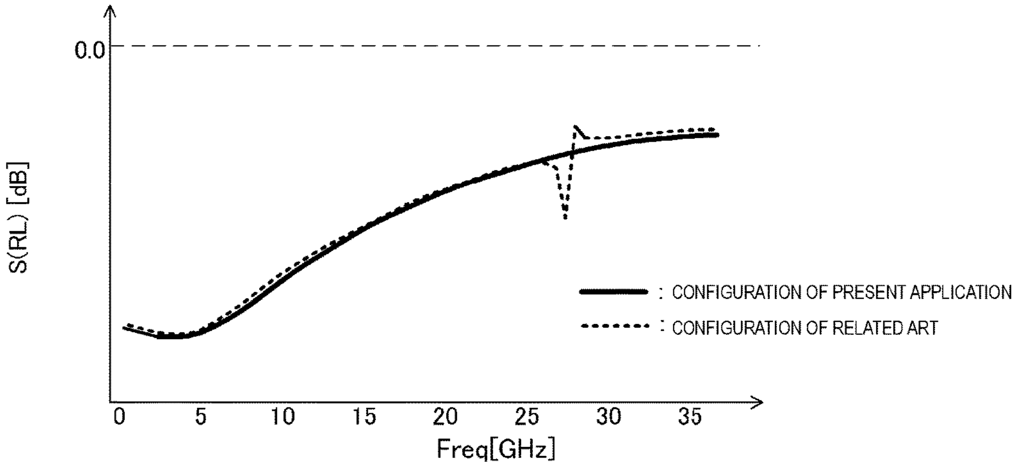
FIG. 4A is a graph illustrating the frequency characteristics of the return loss (RL) of the connector.
Figure 4B:
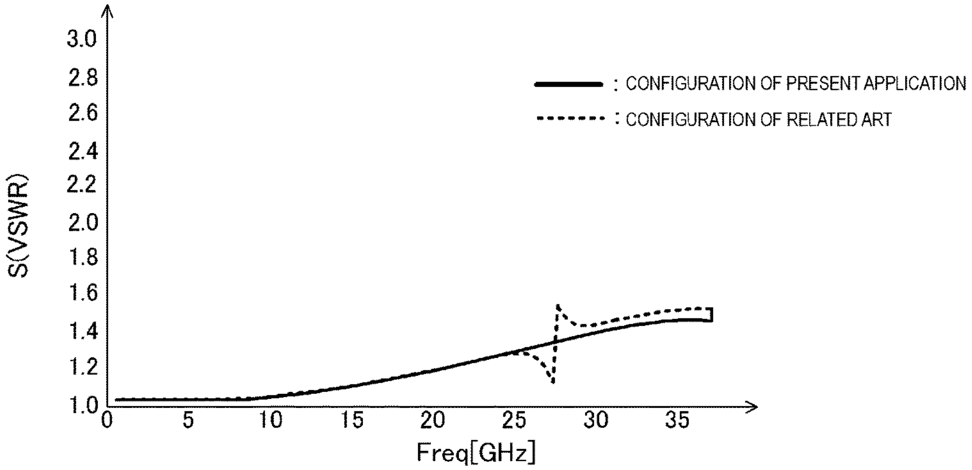
FIG. 4B is a graph illustrating the frequency characteristics of VSWR of the connector.
Figure 4C:
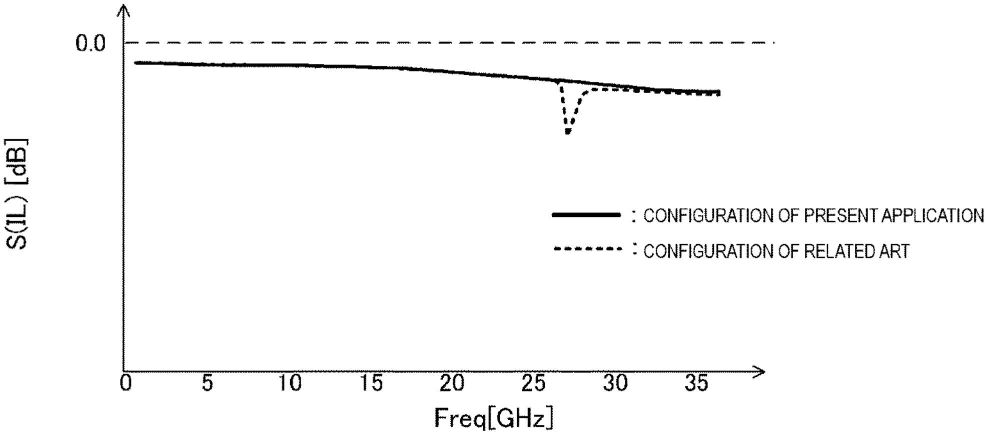
FIG. 4C illustrates the frequency characteristics of insertion loss (IL) of the connector.

FIG. 4A is a graph illustrating the frequency characteristics of the return loss (RL) of the connector, FIG. 4B is a graph illustrating the frequency characteristics of VSWR of the connector, and FIG. 4C illustrates the frequency characteristics of insertion loss (IL) of the connector.

As illustrated in FIGS. 4A, 4B, and 4C, loss due to unwanted resonance generated from around 27 [GHz] to around 28 [GHz] is suppressed by using the configuration of the present application. As a result, the maximum frequency up to which the characteristics were satisfactory in the connector of the related art was 25 [GHz], but the connector 10 of the present application is able to increase this maximum frequency to 30 [GHz] or higher, for example.

In other words, the connector 10 is able to widen the frequency range in which there is low transmission loss to a higher frequency as a result of having the configuration of the present application.

Note that if the side wall members 112 were removed, naturally, the connector would be able to be used up to high frequencies. However, it would be impossible to prevent interference between the inner terminals and the outside environment without the side wall members 112, and this would result in the transmission loss of the connector being increased. In addition, the absence of the side wall members 112 would increase noise radiation.

Therefore, the connector 10 is able to realize excellent transmission characteristics by suppressing interference from the outside environment and widening the supported frequency band up to a higher frequency by using the configuration of the present disclosure.

In addition, in the configuration of this embodiment, one end of the connection part 1225 is fixed to the mounting terminal part 1224 and the other end of the connection part 1225 is a free end. The connection part 1225 abuts against the inner wall 1121 of the side wall member 112 at the other end thereof, which is the free end. Here, the connection part 1225 consists of a metal rod and therefore has elasticity. Therefore, the connection part 1225 abuts against the inner wall 1121 with a prescribed urging force. As a result, the connection part 1225 is pushed against the inner wall 1121, the connection between the connection part 1225 and the side wall members 112 is stable, and the reliability of the connection is improved.

In addition, the side wall members 112 may flex inward as a result of, for example, stress being applied thereto while being installed on the insulating member 130. In this case, urging forces are also generated from the side wall members 112. As a result, the connections between the connection parts 1225 and the side wall members 112 are stable and the connection reliability is improved.

(Configurations of Modifications of Inner Terminals)

FIGS. 5A, 5B, 5C, and 6 are enlarged perspective views illustrating the configurations of modifications of an inner terminal having a connection part.

Figure 5A:
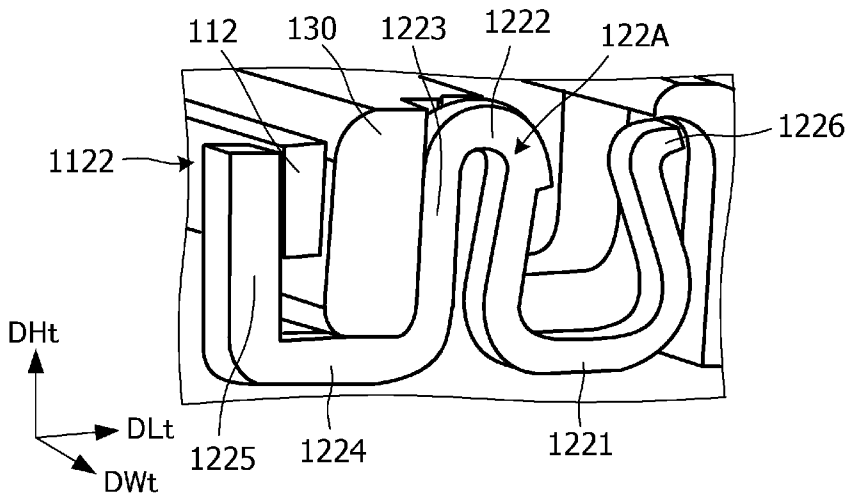
FIGS. 5A, 5B, and 5C are enlarged perspective views illustrating the configurations of modifications of an inner terminal having a connection part.
Figure 5B:
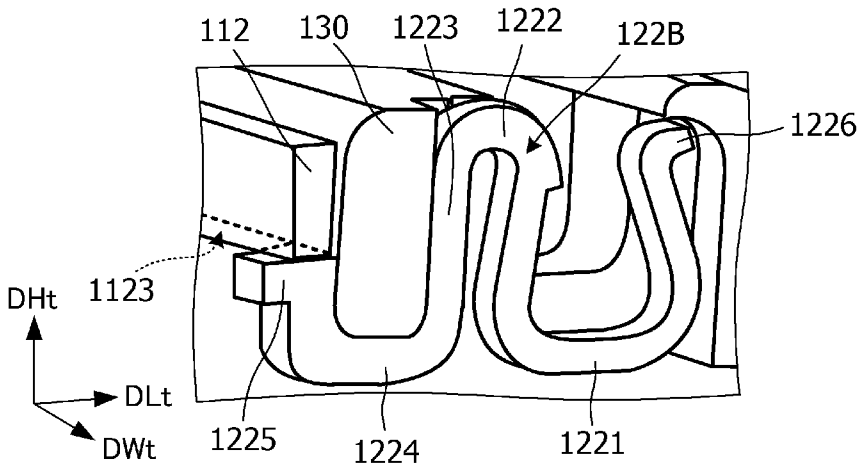
Figure 5C:
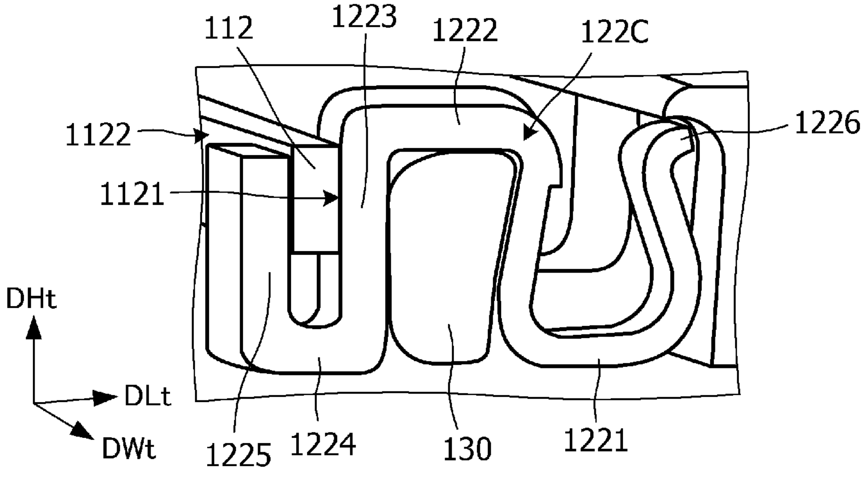
Figure 6:
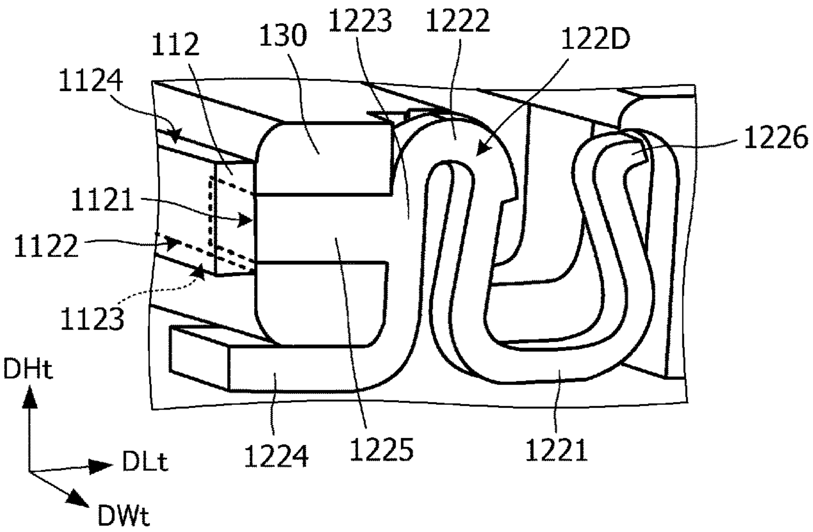
FIG. 6 is an enlarged perspective view illustrating the configuration of a modification of an inner terminal having a connection part.

An inner terminal 122A illustrated in FIG. 5A, an inner terminal 122B illustrated in FIG. 5B, an inner terminal 122C illustrated in FIG. 5C, and an inner terminal 122D illustrated in FIG. 6 are similar to the inner terminals 122 in terms of their basic configuration, and only the parts that are different will be described hereafter.

In the inner terminal 122A illustrated in FIG. 5A, the connection part 1225 is connected to the mounting terminal part 1224. The connection part 1225 abuts against the outer wall 1122 of the side wall member 112. As a result of the connection part 1225 abutting against the outer wall 1122, detachment of the inner terminal 122A can be further suppressed.

In this case, for example, when the side wall member 112 flexes outwardly, the connection between the connection part 1225 and the side wall member 112 is stable and the connection reliability is improved.

In the inner terminal 122B illustrated in FIG. 5B, the connection part 1225 is connected to the mounting terminal part 1224. The connection part 1225 abuts against the bottom wall 1123 of the side wall member 112.

In this case, for example, when the side wall member 112 flexes downwardly, the connection between the connection part 1225 and the side wall member 112 is stable and the connection reliability is improved. In addition, the connection between the connection part 1225 and the side wall member 112 is made more secure by making the length of the connection part 1225 longer than the interval between the mounting terminal part 1224 and the side wall member 112 in the height direction DHt.

In the inner terminal 122C illustrated in FIG. 5C, the length of the routing part 1222 is longer than that in the inner terminal 122A. The connection part 1225 abuts against the outer wall 1122 of the side wall member 112 and the routing part 1223 abuts against the inner wall 1121 of the side wall member 112. In other words, the side wall member 112 is held between the connection part 1225 and the routing part 1223.

In this configuration, the connection between the inner terminal 122C and the side wall member 112 is more stable and secure.

The inner terminal 122D illustrated in FIG. 6 differs from the inner terminal 122 in terms of the shape of the connection part 1225. The connection part 1225 is shaped so as to extend in the length direction DLt. One end of the connection part 1225 is connected to a position midway along the routing part 1223. The other end of the connection part 1225 penetrates through the insulating member 130 and abuts against the inner wall 1121 of the side wall member 112.

In this configuration, the connection distance between the mating part 1221 and the side wall member 112 is shorter. As a result, the connector can realize better transmission characteristics.

Second Embodiment

Figure 7A:
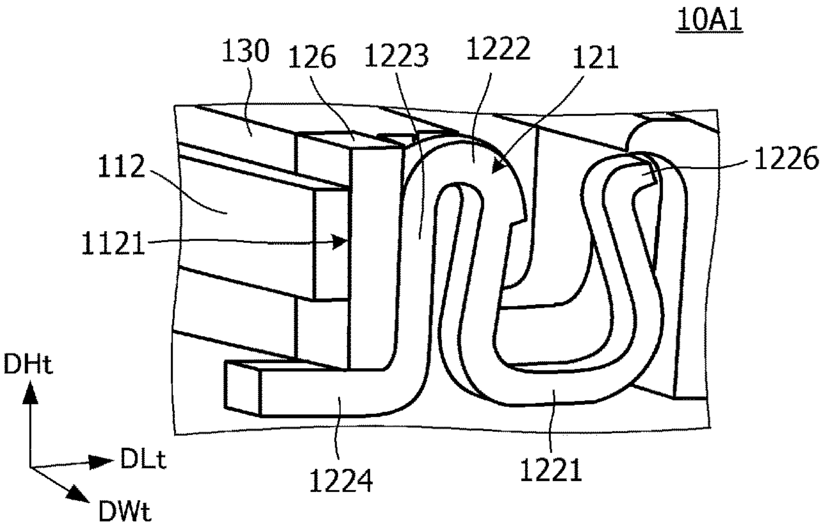
FIGS. 7A and 7B are enlarged perspective views illustrating the shape of a connector according to a Second Embodiment.
Figure 7B:
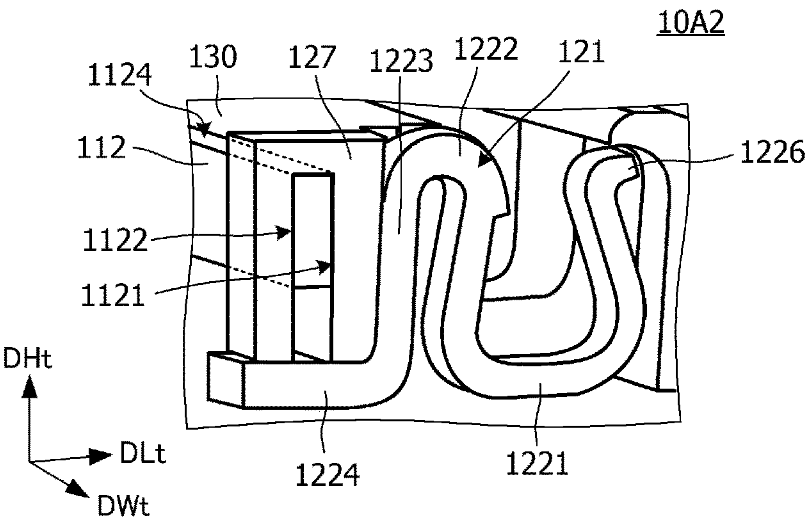

A connector according to a Second Embodiment will be described while referring to the drawings. FIGS. 7A and 7B are enlarged perspective views illustrating the shape of a connector according to a Second Embodiment.

As illustrated in FIGS. 7A and 7B, a connector 10A1 and a connector 10A2 according to the Second Embodiment differ from the connector 10 according to the First Embodiment in that the connector 10A1 and the connector 10A2 include a conductive auxiliary member 126 or a conductive auxiliary member 127. The rest of the configurations of the connector 10A1 and the connector 10A2 are the same as that of the connector 10 and the description of identical parts is omitted.

As illustrated in FIG. 7A, the connector 10A1 includes the conductive auxiliary member 126. The conductive auxiliary member 126 has a rectangular shape, abuts against the routing part 1223 and the mounting terminal part 1224 of the inner terminal 121, and abuts against the inner wall 1121 of the side wall member 112. In other words, the conductive auxiliary member 126 is held between the routing part 1223, the mounting terminal part 1224, and the inner wall 1121 of the side wall member 112.

With this configuration, the conductive auxiliary member 126 has the same function as the connection part 1225 described above. In other words, this configuration is equivalent to forming the connection part 1225 of the inner terminal 122 using a separate member that is separate from the rest of the inner terminal 122. Therefore, the same function as the inner terminal 122 can be realized by the inner terminal 121 and the conductive auxiliary member 126. This enables the above-described operational effects to be obtained without changing the shape of the inner terminal 121.

As illustrated in FIG. 7B, the connector 10A2 includes the conductive auxiliary member 127. The conductive auxiliary member 127 has a rectangular shape including a recess, and abuts against the routing part 1223 of the inner terminal 121 and the mounting terminal part 1224 of the inner terminal 121, and abuts against the inner wall 1121, the outer wall 1122, and the top wall 1124 of the side wall member 112. In other words, the side wall member 112 is held by the conductive auxiliary member 127 and the conductive auxiliary member 127 abuts against the routing part 1223 and the mounting terminal part 1224. In addition, part of the conductive auxiliary member 127 is held between the routing part 1223 and the side wall member 112.

With this configuration, the conductive auxiliary member 127 has the same function as the connection part 1225 and the routing part 1223 described above. Therefore, the same function as the inner terminal 122C can be realized by the inner terminal 121 and the conductive auxiliary member 127. This enables the above-described operational effects to be obtained without changing the shape of the inner terminal 121.

Third Embodiment

Figure 8:
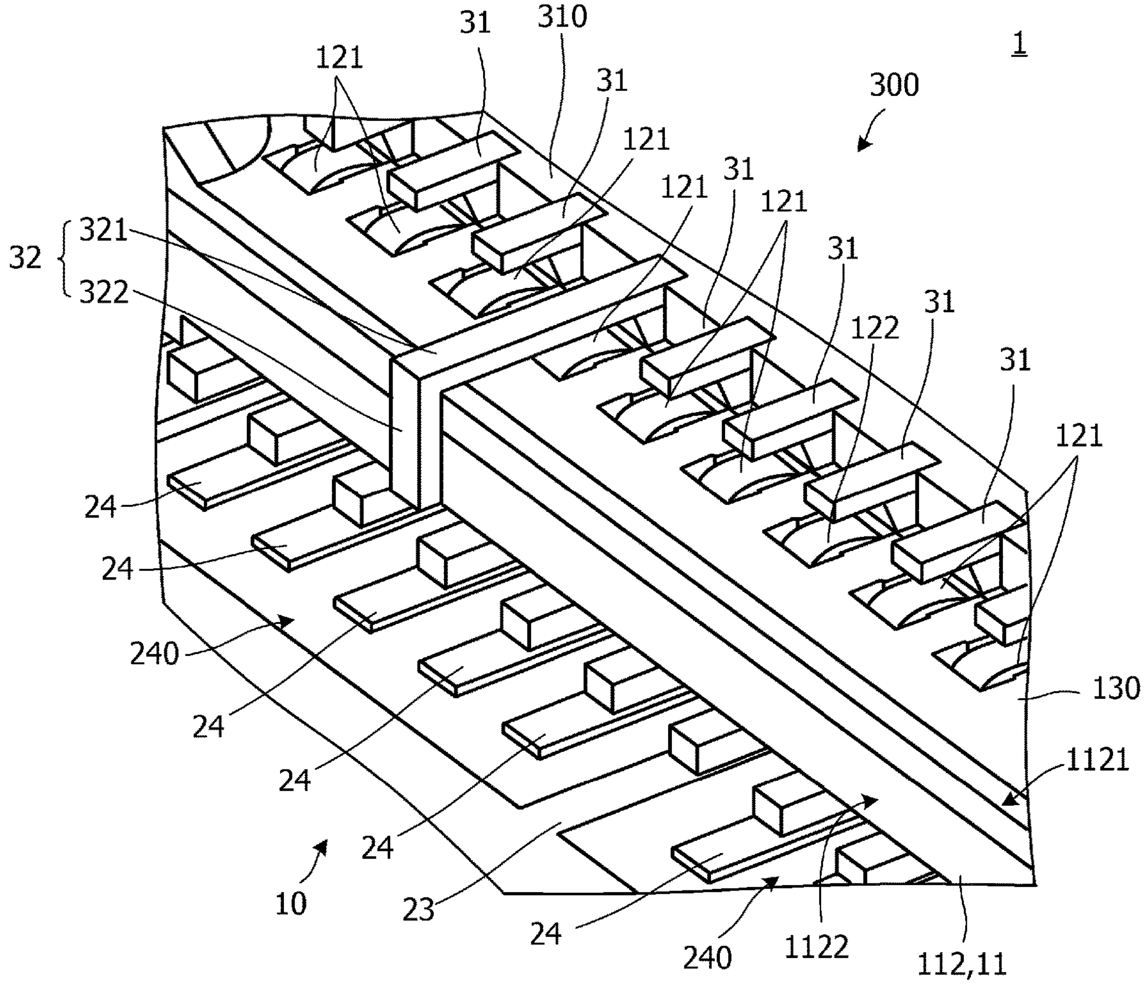
FIG. 8 is an enlarged perspective view illustrating the mated state of a connector set according to a Third Embodiment.
Figure 9:
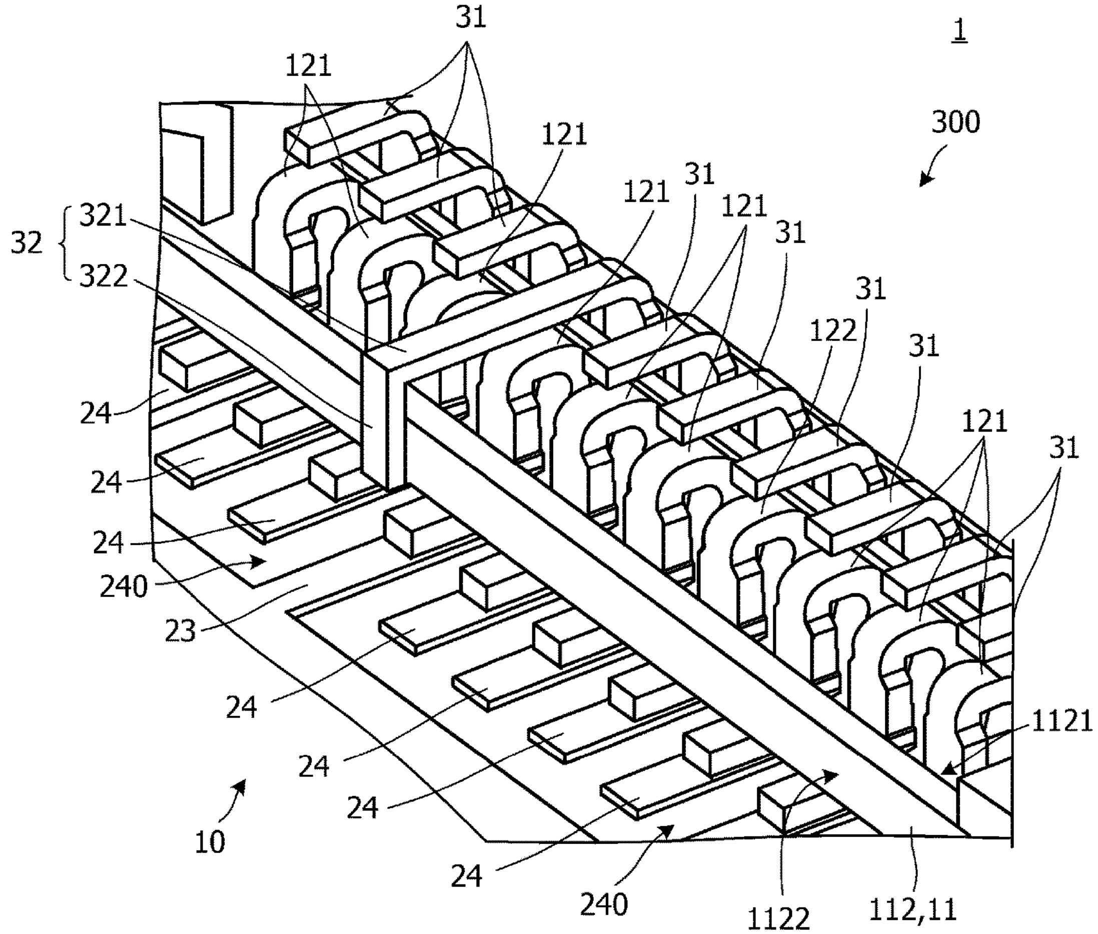
FIG. 9 is an enlarged perspective view illustrating the mated state of a connector set according to a Third Embodiment.

A connector according to a Third Embodiment will be described while referring to the drawings. FIG. 8 is an enlarged perspective view illustrating the mated state of a connector set according to the Third Embodiment. FIG. 9 is an enlarged perspective view in which an insulating member of the connector set illustrated in FIG. 8 is omitted. In the drawings referred to in the following embodiment, the vertical-horizontal dimensional relationships are illustrated in an exaggerated manner where appropriate and may not necessarily correspond to the actual vertical-horizontal dimensional relationships. Some constituent parts are omitted to make the drawings easier to view.

As illustrated in FIGS. 8 and 9, a connector set 1 includes the connector 10 according to the First Embodiment and a connector 300. The connector 10 corresponds to a "second connector" of the present disclosure and the connector 300 corresponds to a "first connector" of the present disclosure.

The connector 300 is mated with the connector 10 from the side near the mating surface 10F of the connector 10. In this way, the connector set 1 is realized.

The connector 300 includes inner terminals 31, inner terminals 32, and an insulating member 310. The number of inner terminals 31 is determined by the number of signals to be transmitted. In addition, the number of inner terminals 32 is also determined as appropriate within a range where the concept of the present disclosure is to be applied. The insulating member 310 corresponds to a "first insulating member" of the present disclosure. The insulating member 130 of the connector 10 corresponds to a "second insulating member" of the present disclosure.

The arrayed states of the inner terminals 31 and the inner terminals 32 are maintained by the insulating member 310. The insulating member 310 is composed of a resin, for example. The inner terminals 31 and the inner terminals 32 are composed of a metal that is electrically conductive and easily deformable. In the state where the connector 300 is mated with the connector 10, the inner terminals 31 and the inner terminals 121 contact each other and the inner terminals 32 and the inner terminals 122 contact each other.

The connector 300 is mounted on a substrate (not illustrated). The substrate includes a base member and has a top surface and a bottom surface. The substrate may be formed of a ceramic multilayer body, for example. A ground conductor, a plurality of ground connection electrodes, and a plurality of signal electrodes are formed on the top surface. The ground connection electrodes and the ground conductor are connected to each other. The signal electrodes are connected to conductor patterns formed in or on inner layer parts of the substrate by via conductors.

The inner terminals 31 of the connector 300 are mounted on the signal electrodes. The signal electrodes are isolated from the ground conductor and the ground connection electrodes. In other words, the inner terminals 31 correspond to "first inner terminals" of the present disclosure.

The inner terminals 32 of the connector 300 are mounted on the ground connection electrodes. The ground connection electrodes are connected to the ground conductor. In other words, the inner terminals 32 correspond to "second inner terminals" of the present disclosure.

The inner terminals 31 and the inner terminals 32 are each formed, for example, by bending a rod-shaped conductor having a prescribed cross-sectional area. The cross sections of the inner terminals 31 and the inner terminals 32 are substantially rectangular. The cross-sectional areas of the inner terminals 31 and the inner terminals 32 are basically identical. The inner terminals 31 and the inner terminals 32 may be formed by die-cutting an elastic metal member.

Each inner terminal 32 consists of a routing part 321 and a connection part 322, and the routing part 321 and the connection part 322 are shaped so as to be substantially perpendicular to each other. The connection part 322 of the inner terminal 32 is disposed so as to abut against the outer wall 1122 of the side wall member 112.

In other words, even though the connector 300 is not equipped with side wall members, the connector 10 and the connector 300 are able to realize excellent transmission characteristics by suppressing interference from the outside environment and widening the supported frequency band up to a higher frequency due to the connector 10, which mates with the connector 300, being provided with the side wall members 112 and the inner terminals 32 abutting against the side wall members 112.

As described above, the routing parts 321 and the connection parts 322 of the inner terminals 32 are formed so as to be integrated with each other. More specifically, each inner terminal 32 is formed such that the routing part 321 and the connection part 322 are connected to each other. With this configuration, the connection between the routing part 321 and the connection part 322 is more secure and the reliability of the connection state to the side wall member 112 is further improved.

In this embodiment, the inner terminals 121 and 122 of the connector 10 have been illustrated as not including the connection parts 1225. However, the inner terminals 121 and 122 may include the connection parts 1225.

Fourth Embodiment

Figure 10:
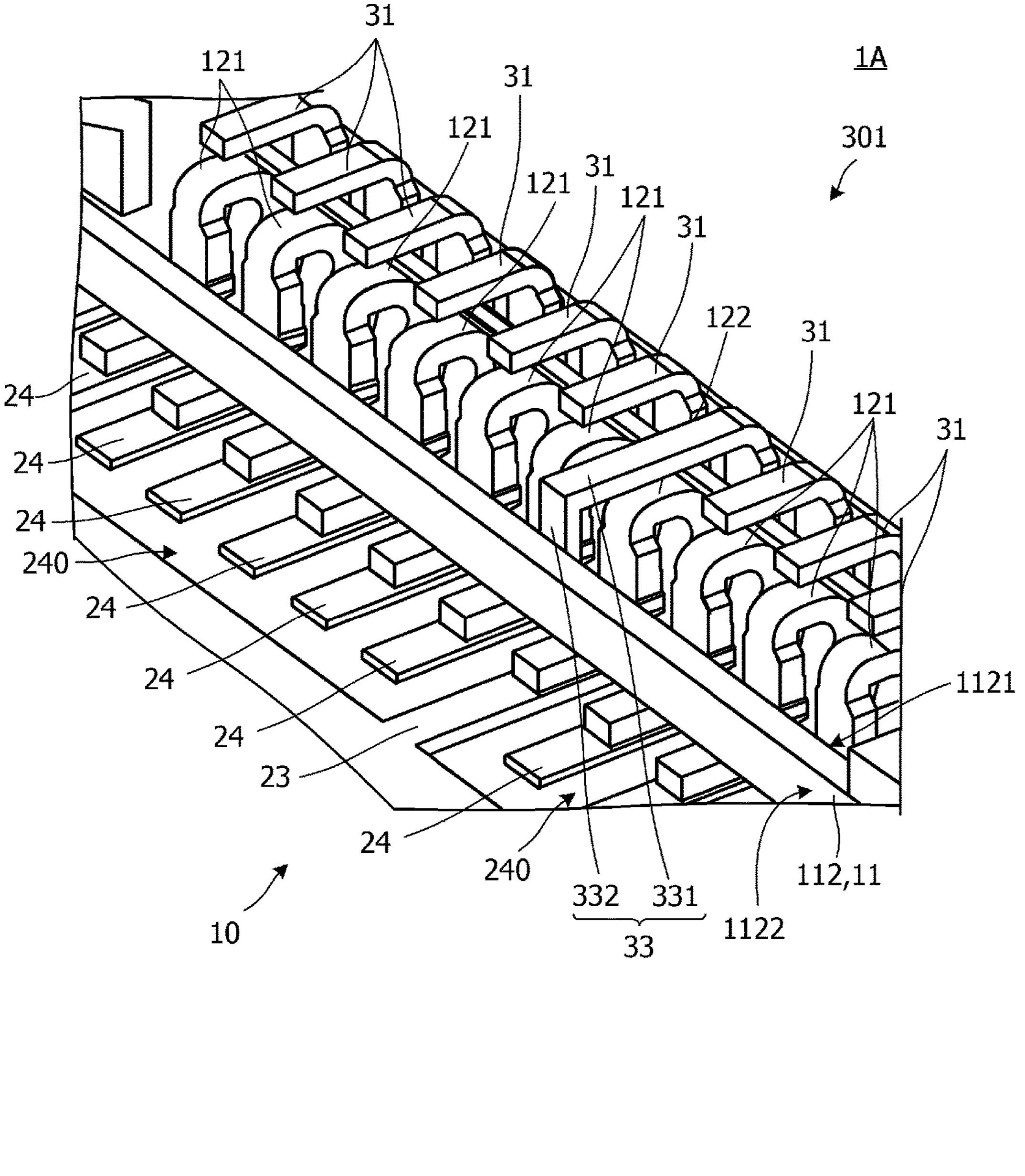
FIG. 10 is an enlarged perspective view illustrating the mated state of a connector set according to a Fourth Embodiment.

A connector according to a Fourth Embodiment will be described while referring to the drawings. FIG. 10 is an enlarged perspective view illustrating the mated state of a connector set according to the Fourth Embodiment. In the drawing referred to in the following embodiment, the vertical-horizontal dimensional relationships are illustrated in an exaggerated manner where appropriate and may not necessarily correspond to the actual vertical-horizontal dimensional relationships. Some constituent parts are omitted to make the drawing easier to view.

As illustrated in FIG. 10, a connector set 1A includes the connector 10 according to the First Embodiment and a connector 301. The connector 10 corresponds to a "second connector" of the present disclosure and the connector 301 corresponds to a "first connector" of the present disclosure.

The connector 301 differs from the connector 300 of the Third Embodiment in that the connector 301 includes inner terminals 33 and does not include the inner terminals 32. The rest of the configuration of the connector 301 is the same as that of the connector 300 and description of identical parts is omitted.

The arrayed states of the inner terminals 31 and the inner terminals 33 are maintained by the insulating member 310. The inner terminals 31 and the inner terminals 33 are composed of a metal that is electrically conductive and easily deformable.

The inner terminals 33 of the connector 301 are mounted on the ground connection electrodes. The ground connection electrodes are connected to the ground conductor. In other words, the inner terminals 33 correspond to "second inner terminals" of the present disclosure.

Each inner terminal 33 is formed, for example, by bending a rod-shaped conductor having a prescribed cross-sectional area. The cross section of the inner terminal 33 has a substantially rectangular shape. The inner terminals 33 may be formed by die-cutting an elastic metal member.

Each inner terminal 33 consists of a routing part 331 and a connection part 332, and the routing part 331 and the connection part 332 are shaped so as to be substantially perpendicular to each other. The connection part 322 of the inner terminal 33 is disposed so as to abut against the inner wall 1121 of the side wall member 112.

Even through the connector 301 according to this embodiment is not equipped with side wall members, the connector 10 and the connector 301 are able to realize excellent transmission characteristics by suppressing interference from the outside environment and widening the supported frequency band up to a higher frequency due to the connector 10, which mates with the connector 301, being provided with the side wall members 112 and the inner terminals 33 abutting against the side wall members 112.

As described above, the routing parts 331 and the connection parts 332 of the inner terminals 33 are formed so as to be integrated with each other. More specifically, each inner terminal 33 is formed such that the routing part 331 and the connection part 332 are connected to each other. With this configuration, the connection between the routing part 331 and the connection part 332 is more secure and the reliability of the connection state to the side wall member 112 is further improved.

In this embodiment, the inner terminals 121 and 122 of the connector 10 have been illustrated as not including the connection parts 1225. However, the inner terminals 121 and 122 may include the connection parts 1225.

Fifth Embodiment

Figure 11:
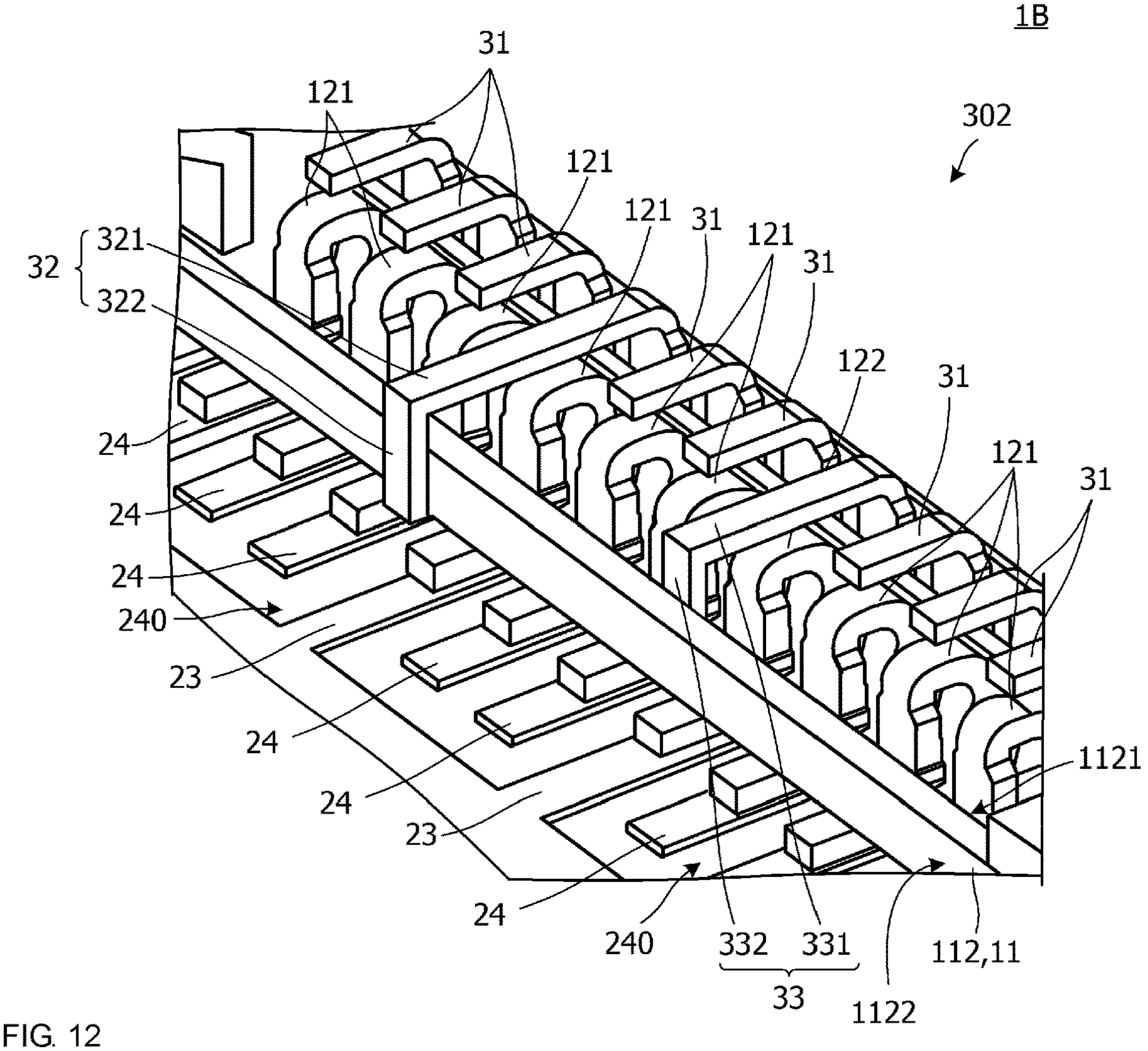
FIG. 11 is an enlarged perspective view illustrating the mated state of a connector set according to a Fifth Embodiment.

A connector according to a Fifth Embodiment will be described while referring to the drawings. FIG. 11 is an enlarged perspective view illustrating the mated state of a connector set according to the Fifth Embodiment. In the drawing referred to in the following embodiment, the vertical-horizontal dimensional relationships are illustrated in an exaggerated manner where appropriate and may not necessarily correspond to the actual vertical-horizontal dimensional relationships. Some constituent parts are omitted to make the drawing easier to view.

As illustrated in FIG. 11, a connector set 1B includes the connector 10 according to the First Embodiment and a connector 302. The connector 10 corresponds to a "second connector" of the present disclosure and the connector 302 corresponds to a "first connector" of the present disclosure.

The connector 302 differs from the connector 300 of the Third Embodiment in that the connector 302 further includes the inner terminals 33 described in the Fourth Embodiment. In other words, the configuration is realized by combining the connector set 1 of the Third Embodiment and the connector set 1A of the Fourth Embodiment. The rest of the configuration of the connector 302 is the same as that of the connector 300 and description of identical parts is omitted.

The arrayed states of the inner terminals 31, the inner terminals 32, and the inner terminals 33 are maintained by the insulating member 310. The inner terminals 31, the inner terminals 32, and the inner terminals 33 are composed of a metal that is electrically conductive and easily deformable.

The inner terminals 32 and the inner terminals 33 of the connector 301 are mounted on the ground connection electrodes. The ground connection electrodes are connected to the ground conductor. In other words, the inner terminals 32 and the inner terminals 33 correspond to "second inner terminals" of the present disclosure.

The inner terminals 32 and the inner terminals 33 are each formed, for example, by bending a rod-shaped conductor having a prescribed cross-sectional area. The cross sections of the inner terminals 32 and the inner terminals 33 are substantially rectangular. The inner terminals 32 and the inner terminals 33 may be formed by die-cutting an elastic metal member.

Each inner terminal 32 consists of a routing part 321 and a connection part 322, and the routing part 321 and the connection part 322 are shaped so as to be substantially perpendicular to each other. The connection part 322 of the inner terminal 32 is disposed so as to abut against the outer wall 1122 of the side wall member 112.

Each inner terminal 33 consists of a routing part 331 and a connection part 332, and the routing part 331 and the connection part 332 are shaped so as to be substantially perpendicular to each other. The connection part 322 of the inner terminal 33 is disposed so as to abut against the inner wall 1121 of the side wall member 112.

Even through the connector 302 according to this embodiment is not equipped with side wall members, the connector 10 and the connector 302 are able to realize excellent transmission characteristics by suppressing interference from the outside environment and widening the supported frequency band up to a higher frequency due to the connector 10, which mates with the connector 302, being provided with the side wall members 112 and the inner terminals 32 and 33 abutting against the side wall members 112.

Sixth Embodiment

Figure 12:
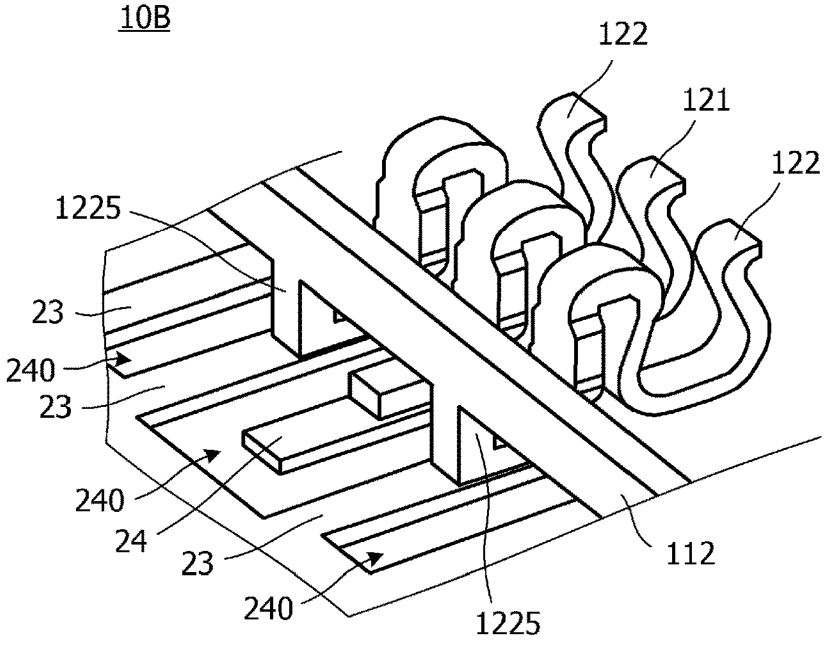
FIG. 12 is an enlarged perspective view illustrating the shape and layout of a connector according to a Sixth Embodiment.

A connector according to a Sixth Embodiment will be described while referring to the drawings. FIG. 12 is an enlarged perspective view illustrating the shape and arrangement of a connector according to the Sixth Embodiment.

As illustrated in FIG. 12, a connector 10B differs from the connector 10 in that the inner terminals 122 and the side wall members 112 are formed so as to be integrated with each other and in terms of arrangement patterns of the inner terminals 122. The rest of the configuration of the connector 10B is the same as that of the connector 10 and description of identical parts is omitted.

The inner terminals 122 are formed so as to be integrated with the side wall members 112. More specifically, the inner terminals 122 are formed so as to be connected to the side wall members 112 at the connection parts 1225 thereof. With this configuration, the connections between the inner terminals 122 and the side wall members 112 are more secure and the connection reliability is further improved.

In addition, two inner terminals 122 are disposed with an inner terminal 121, which is for signal transmission, interposed therebetween in the direction in which the inner terminals are arrayed. This enables the isolation between the inner terminals 121 used for signal transmission to be improved.

This integrated formation shape can also be applied to other embodiments.

Seventh Embodiment

Figure 13:
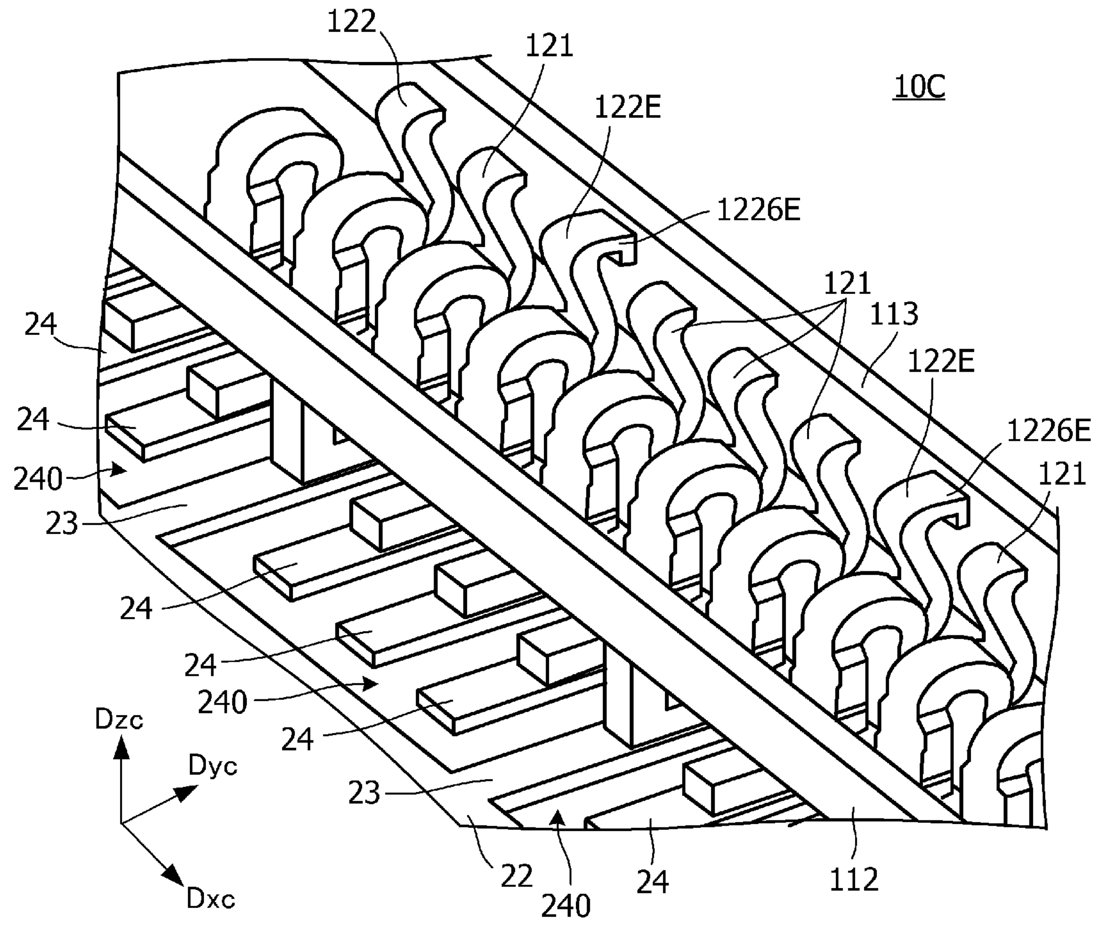
FIG. 13 is an enlarged perspective view illustrating the shape and layout of a connector according to a Seventh Embodiment.

A connector according to a Seventh Embodiment will be described while referring to the drawings. FIG. 13 is an enlarged perspective view illustrating the shape and arrangement of a connector according to the Seventh Embodiment.

As illustrated in FIG. 13, a connector 10C differs from the connector 10 in that the connector 10C includes a center member 113 and inner terminals 122E. The rest of the configuration of the connector 10C is the same as that of the connector 10 and description of identical parts is omitted. The center member 113 corresponds to a "ground connection member" of the present disclosure.

An outer terminal of the connector 10C includes the center member 113 in addition to the end members 111 and the side wall members 112. The center member 113 is a plate-like member shaped so as to extend in the direction Dxc, similarly to the side wall members 112. The center member 113 is connected to the ground conductor 22 of the substrate 20. The center member 113 is disposed between two rows of inner terminals. In other words, the center member 113 is disposed on the opposite side of the inner terminal group of one row from the side wall member 112.

Each inner terminal 122E includes an inner end portion 1226E. The inner end portion 1226E abuts against the center member 113.

With this configuration, positions midway along the extension direction of the side wall members 112 are connected to the ground potential via the center member 113 as well. Thus, the connector 10C is able to more reliably suppress degradation of the transmission characteristics.

When the center member 113 is not directly connected to the ground conductor 22 of the substrate 20 and is connected to the end members 111, unwanted resonance generated by the center member 113 is suppressed by using this configuration. Thus, in the structure including the center member 113, the connector 10C is able to more reliably suppress degradation of the transmission characteristics.

The configurations of the above-described embodiments can be combined as appropriate and operational effects of those combinations can be obtained.

What is claimed is:

1. A connector comprising:

a plurality of inner terminals arrayed with intervals therebetween in a first direction;

an insulating member that supports the plurality of inner terminals; and an outer terminal that is disposed around the plurality of inner terminals with the insulating member interposed therebetween and that is configured to connect to a ground potential, wherein the outer terminal includes a side wall member that is shaped so as to extend in the first direction and be parallel to the plurality of arrayed inner terminals, the plurality of inner terminals includes at least one first inner terminal that is configured to connect to a signal line, and at least one second inner terminal that is configured to connect to the ground potential, and the second inner terminal includes a connection part that abuts against the side wall member, a mating part that has a U-shaped side surface and with which an inner terminal of a connector that is a mating target mates, a mounting terminal part that is used for mounting on a substrate, and a routing part that connects the mating part and the mounting terminal part to each other, and the connection part is connected to the mounting terminal part.

2. The connector according to claim 1, wherein the second inner terminal is provided between a plurality of the first inner terminals in the first direction.

3. The connector according to claim 1, wherein the second inner terminal has a shape obtained by adding the connection part to the first inner terminal.

4. The connector according to claim 1, wherein the routing part and the connection part hold the side wall member therebetween.

5. The connector according to claim 1, wherein the connection part is shaped so as to extend in a direction perpendicular to a direction in which the side wall member extends, and has elasticity, one end of the connection part is connected to the mounting terminal part, and another end of the connection part abuts against a wall surface of the side wall member that is on a side nearer the mating part of the first inner terminal.

6. The connector according to claim 1, wherein the connection part is shaped so as to extend in a direction perpendicular to a direction in which the side wall member extends, and has elasticity, one end of the connection part is connected to the mounting terminal part, and another end of the connection part abuts against a wall surface of the side wall member that is on an opposite side from a wall surface of the side wall member that nearer the mating part of the first inner terminal.

7. The connector according to claim 1, wherein the second inner terminal is disposed next to at least one first inner terminal.

8. The connector according to claim 1, wherein the second inner terminal is connected to a ground connection member that is disposed on an opposite side of the first inner terminal from the side wall member.

9. The connector according to claim 1, wherein the connection part is a separate member from other parts constituting the second inner terminal.

10. The connector according to claim 1, wherein a plurality of the second inner terminals are disposed in the first direction, and an interval between adjacent second inner terminals among the plurality of second inner terminals is smaller than ½ a wavelength of a highest frequency of radio-frequency signals input to or output from the connector.

11. The connector according to claim 2, wherein the second inner terminal has a shape obtained by adding the connection part to the first inner terminal.

12. The connector according to claim 2, wherein the second inner terminal is disposed next to at least one first inner terminal.

13. The connector according to claim 2, wherein the second inner terminal is connected to a ground connection member that is disposed on an opposite side of the first inner terminal from the side wall member.

14. The connector according to claim 2, wherein the connection part is a separate member from other parts constituting the second inner terminal.

15. A connector set comprising:
a first connector; and
a second connector configured to mate with the first connector,
wherein the first connector includes a plurality of first connector inner terminals that are arrayed with intervals therebetween in a first direction and a first insulating member that supports the plurality of first connector inner terminals,
the plurality of first connector inner terminals includes a first inner terminal that is configured to connect to a signal line and a second inner terminal that is configured to connect to a ground potential,
the second connector includes
a plurality of second connector inner terminals that are arrayed so as to mate with the plurality of first connector inner terminals,
a second insulating member that supports the plurality of second connector inner terminals, and
a side wall member that is disposed around the plurality of second connector inner terminals with the second insulating member interposed therebetween,
the side wall member abuts against the second inner terminal of the first connector inner terminals, and
the second inner terminal includes
a mating part that has a U-shaped side surface and with which an inner terminal of a connector that is a mating target mates,
a mounting terminal part that is used for mounting on a substrate, and
a routing part that connects the mating part and the mounting terminal part to each other, and
the connection part is connected to the mounting terminal part.

16. The connector set according to claim 15, wherein the second inner terminal is provided between a plurality of the first inner terminals of the first connector inner terminals in the first direction.

17. The connector set according to claim 15, wherein the second inner terminal of the first connector inner terminals abuts against an inner wall surface of the side wall member on a side where the second inner terminal of the first connector inner terminals and the second connector inner terminals mate.

18. The connector set according to claim 15, wherein the second inner terminal of the first connector inner terminals abuts against an outer wall surface of the side wall member on an opposite side from a side where the second inner terminal of the first connector inner terminals and the second connector inner terminals mate.

19. The connector set according to claim 15, wherein the second inner terminal is disposed next to the first inner terminal.

20. The connector set according to claim 15, wherein the second inner terminal is connected to a ground connection member that is disposed on an opposite side of the first inner terminal from the side wall member.

* * * * *